Patented Aug. 25, 1931

1,820,455

UNITED STATES PATENT OFFICE

WILLIAM C. HOOEY, OF PALMERTON, PENNSYLVANIA, ASSIGNOR TO THE NEW JERSEY ZINC COMPANY, OF NEW YORK, N. Y., A CORPORATION OF NEW JERSEY

TREATMENT OF ZINC-BEARING MATERIAL

No Drawing. Application filed February 7, 1929. Serial No. 338,335.

This invention relates to the treatment of zinc-bearing material, such as zinc sulfide (blende) ores, concentrates and the like, and has for its object the provision of improvements in the treatment of zinc-bearing material for the production of a purified product capable of forming relatively pure zinc products, such as zinc metal or spelter, zinc oxide, zinc sulfide, zinc-containing liquors, etc.

Certain zinc-bearing materials, such as zinc ores, concentrates and the like, are frequently contaminated with water-insoluble impurities, such as water-insoluble compounds of magnesium and/or calcium. When present in appreciable amounts, these impurities prove objectionable in the manufacture of certain zinc products. Such impurities are not readily removable since they are not water-soluble and cannot therefore be washed out. They not only deleteriously affect the quality of the finished zinc product, but they also usually exert undesirable influences on the process of working up the zinc products. Magnesium and/or calcium are usually present in the zinc ores or concentrates as carbonates, though they will also sometimes be present in the form of other compounds, such as silicates, aluminates, etc.

My investigations have shown that zinc-bearing material, more especially zinc sulfide (blende) ores, containing objectionable impurities in appreciable amounts, such as water-insoluble compounds of magnesium and/or calcium, may be appropriately treated, either in batches or continuously, to remove such impurities in substantial amounts. The purified zinc-bearing material is then in condition to be suitably processed to effect the production of relatively pure zinc products, more especially as far as magnesium and/or calcium is concerned.

According to my invention, zinc-bearing material contaminated with appreciable amounts of water-insoluble impurities is subjected to an appropriate sulfation step to convert the original water-insoluble impurities into relatively water-soluble compounds, such as water-insoluble compounds of magnesium and/or calcium into relatively water-soluble sulfates of magnesium and/or calcium. The relatively water-soluble impurities are then suitably separated from the zinc-bearing material. Such relatively water-soluble impurities as are in fact not readily soluble in water, particularly in cold water, may be treated to render them more readily soluble, and/or they may be removed by hydroseparation. The treatment process contemplated by the invention is conducted in such manner as substantially to inhibit the formation of water-soluble zinc compounds, at least in appreciable amounts.

The invention may be illustrated by considering its practice on a representative sample of zinc sulfide (blende) concentrates:

About 900 tons of the concentrates, contaminated with water-insoluble compounds or magnesium and calcium in objectionable amounts, were carefully roasted in a multi-hearth wedge furnace with a maxium temperature of about 800° C. in order to effect the sulfation of the magnesium and calcium. For purposes of convenience, the reactions that took place during the sulfation operation may be set out in this manner:

(1) $2ZnS + 3O_2 \rightarrow 2ZnO + 2SO_2$
(2) $2MgO + 2SO_2 + O_2 \rightarrow 2MgSO_4$
(3) $2CaO + 2SO_2 + O_2 \rightarrow 2CaSO_4$ It is essential that the roasting operations be carried out under carefully regulated conditions, in order that substantial amounts of the magnesium and calcium may be converted into the sulfates of those metals without at the same time sulfatizing appreciable amounts of the zinc. The sulfation operation depends for its success on the careful regulation of the amounts of oxidizing air introduced to the roast charge, and on heating the charge in successive stages at gradually increasing but controlled conditions of temperature. Unless recognition is made of the exothermic heating effects produced by the oxidation of the zinc sulfide, the charge may rise too rapidly in temperature. This tendency may be offset by the introduction of appropriate amounts of fresh air. On reaching appropriate temperatures, certain metallic constituents of the charge, notably iron oxides, exert a catalytic action on the sulfur dioxide. Sulfur trioxide is formed as a result of this action, and it becomes the essential sulfating agent. An excess of air must be provided to secure the oxidation of sulfur dioxide to sulfur trioxide. With the zinc sulfide ore on which the invention has been practiced, a sufficient conversion of sulfur dioxide to sulfur trioxide is attained at temperatures around 800° C.

The roasted concentrates were delivered by a belt conveyor to a main tank 18 feet in diameter and 10 feet high, equipped with a mechanical agitator and a number of air jets. The air jets consisted of a number of pipes leading into the tank near its bottom, and were connected to a compressed air line. The concentrates were delivered to the tank at the rate of about 25 tons per 24 hours, and water was added in amount to maintain a ratio of approximately 10 of water to 1 of concentrates. The temperature of the pulp in the tank was kept between 50–75° C. by means of live steam introduced into the pulp body maintained within the tank. The mechanical agitator, supplemented by the air jets, was set in operation to keep the concentrates substantially evenly distributed throughout the pulp body. The pulp was retained in the tank about 7 hours.

The main tank was arranged to discharge continuously into a small duplex single-stage drag classifier, about 6 feet by 10 feet, on which the concentrates were subjected to a counter-current washing operation by means of fresh amounts of water. As the rakes of the drag classifier moved the concentrates up its inclined bottom, the fresh wash water was permitted to flow down through and over the concentrates in the opposite direction.

The partially dewatered concentrates discharged from the classifier were delivered by a drag conveyor to a stock pile, while the overflow from the classifier, containing fine ore particles in suspension, was delivered to two settling tanks in series. These settling tanks were about 15 feet in diameter and 6 feet high. The ore particles that settled in these tanks were mixed with the ore discharge from the classifier, while the overflow water, containing sulfates of magnesium and calcium, was run to waste.

The agitation of the concentrates in the main tank serves to make the magnesium sulfate and some of the calcium sulfate go into solution. While magnesium sulfate is considered relatively soluble in cold water, its solubility is greatly increased in hot water. For that reason, it is desirable to elevate the temperature of the pulp in the main tank. This may conveniently be effected by introducing live steam into the pulp. The live steam is preferably introduced at or near the bottom of the tank, so that the pressure with which it is introduced into the tank may be utilized to agitate the pulp body and thus disseminate the concentrates throughout the pulp body.

While calcium sulfate is water-soluble, the quantities of water required are so great that it may be preferable to remove the calcium sulfate by other methods. The calcium sulfate particles will be distributed throughout the pulp body in a very finely disseminated condition. Since the concentrate particles are larger and heavier than the calcium sulfate particles, the calcium sulfate particles may in large part be gently washed away from the concentrate particles. The calcium sulfate particles are, however, advantageously separated from the ore concentrate particles by hydroseparation. That is to say, the pulp of ore concentrates and calcium sulfate particles may be conducted to a settling tank wherein sufficient agitation is provided to keep the calcium sulfate in suspension while permitting the ore particles to settle. The calcium sulfate in suspension may then be removed by decantation, either continuously or otherwise.

The treatment of the zinc-bearing material is conducted in such manner as not to render the zinc water-soluble, at least not in appreciable amounts. Should the zinc content of the zinc-bearing material be converted into water-soluble compounds, the washing and leaching operations will remove appreciable amounts of valuable zinc. For that reason it is very necessary to conduct the roasting and sulfation operation under carefully regulated conditions. Since zinc sulfate is readily soluble in water, the roasting and sulfation operation is conducted in such manner as to inhibit the formation of appreciable amounts of zinc sulfate. This desirable result is accomplished by carefully controlling the temperature of roasting and sulfation. My investigations have shown that the zinc sulfide (blende) ores above mentioned should be roasted at a temperature in the neighborhood of 800° C.

In the washing or leaching of roasted and sulfated zinc concentrates, as indicated above, it is also important to provide for the effects produced when the water vehicle builds up an unduly large amount of water-soluble magnesium sulfate. Magnesium sulfate tends to react with zinc oxide to form zinc sulfate, a compound of zinc that is readily soluble in water. The reaction may be set out in this manner:

(4) $MgSO_4 + ZnO \rightarrow MgO + ZnSO_4$

A relatively large ratio of water to ore appears to aid in inhibiting this reaction.

If it is desired to treat the roasted and sulfated zinc-bearing material in a continuous manner, an arrangement of apparatus such as disclosed in my copending application, Serial No. 328,609, filed December 26, 1928, (which has since issued into United States Patent No. 1,799,166 dated April 4, 1931) may advantageously be employed. According to the practice therein disclosed, zinc-bearing material and water may be continuously conducted into the first of a series of connecting tanks, located at successively lower levels in order that the overflow from one tank may run by gravity into the next succeeding tank. During the passage from one tank to another, the pulp is suitably agitated to disseminate the concentrate particles throughout the liquid vehicle. Suitable provision may also be made for elevating the temperature of the pulp, such as by placing steam coils in the tanks or introducing live steam into the pulp body.

The overflow from the tanks may then be conducted by gravity to a drag classifier, such as has also been described above, where the concentrates are dewatered and subjected to counter-current washing. Settling pits or tanks may be employed to recover fine ore particles that have been carried away with the wash waters. With proper agitation the ore particles settle to the bottom, while calcium sulfate particles remain in suspension in the layer of water above. The water is separately withdrawn, and the ore particles recovered for their zinc content.

The practice of the invention will readily lend itself to various modifications, and it is of course to be understood that the invention is not to be confined to the exact procedures outlined above. For example, it may be desirable to effect the removal of magnesium and not that of calcium. In that event no special effort need be made to separate the finely suspended calcium sulfate particles from the ore concentrates. Instead of providing special means for heating the pulp to make the magnesium sulfate more readily water-soluble, the concentrates may be directly conducted from the roasting and sulfating furnace into a tank of cold water. The hot concentrates will serve to elevate the temperature of the pulp water.

If the process is carefully conducted, a substantial amount of the magnesium and calcium content of zinc sulfide (blende) concentrates may be appropriately removed with a loss of zinc running well under one per cent. The net result is so to purify the zinc-bearing material that substantially pure zinc products may be made therefrom, at least as far as magnesium and calcium are concerned.

In the event that the roasting operation is not carefully enough conducted to effect the sulfation of all or substantially all of the calcium and/or magnesium present in the zinc-bearing material, the leaching operation may advantageously be carried out with water containing carbon dioxide in solution in amounts sufficient to convert the calcium and magnesium to water-soluble compounds, such as bicarbonates. Carbon dioxide may be injected into the ore pulp to carbonate the water.

I claim:

1. The method of treating zinc-bearing material in the form of zinc sulfide (blende) concentrates containing objectionable water-insoluble impurities in appreciable amounts which comprises subjecting the concentrates to a carefully regulated roasting operation whereby the impurities are converted to sulfates while inhibiting the formation of an appreciable amount of zinc compounds that are water-soluble, and removing the impurities that have been converted to sulfates.

2. The method of treating zinc-bearing material in the form of zinc sulfide (blende) concentrates containing objectionable water-insoluble impurities in appreciable amounts which comprises subjecting the concentrates to a carefully regulated roasting operation whereby the impurities are converted to sulfates while inhibiting the formation of an appreciable amount of zinc compounds that are water-soluble, and leaching out the impurities that have been converted to sulfates with water at an elevated temperature.

3. The method of treating zinc-bearing material in the form of zinc sulfide (blende) concentrates containing water-insoluble compounds of magnesium and calcium which comprises roasting the concentrates at carefully regulated temperatures to convert substantially all of the magnesium and calcium into sulfates of those metals while converting the zinc sulfide into zinc oxide and substantially inhibiting the formation of zinc sulfate, and then leaching the so roasted concentrates to remove the sulfates of magnesium and calcium.

4. The method of treating zinc-bearing material in the form of zinc sulfide (blende) concentrates containing water-insoluble compounds of magnesium and calcium which comprises roasting the concentrates at carefully regulated temperatures to convert substantially all of the magnesium and calcium into sulfates of those metals while converting the zinc sulfide into zinc oxide, and then leaching the so roasted concentrates with hot water to remove the sulfates of magnesium and calcium.

5. The method of treating zinc-bearing material in the form of zinc sulfide (blende) concentrates containing water-insoluble compounds of magnesium and calcium which comprises roasting the concentrates in the presence of air to convert the magnesium and calcium at least in part to sulfates of those metals while inhibiting the formation of objectionable amounts of zinc sulfate, subjecting the roasted concentrates in the form of a pulp to the action of an appropriate acid in amount adapted to effect the conversion of unsulfated calcium and magnesium into compounds of the acid without at the same time forming an objectionable amount of zinc compounds of that acid, and leaching the so treated concentrates for the removal of the impurities.

6. The method of treating zinc-bearing material in the form of zinc sulfide (blende) concentrates containing water-insoluble compounds of magnesium and calcium which comprises roasting the concentrates in the presence of air to convert the magnesium and calcium at least in part to sulfates of those metals while inhibiting the formation of objectionable amounts of zinc sulfate, subjecting the roasted concentrates in the form of a pulp to the action of carbonic acid in amount adapted to effect the conversion of unsulfated calcium and magnesium into compounds of the acid without at the same time forming an objectionable amount of zinc compounds of that acid, and leaching the so treated concentrates for the removal of the impurities.

7. The method of treating zinc-bearing material in the form of zinc sulfide (blende) concentrates containing objectionable amounts of water insoluble compounds of magnesium and calcium which comprises roasting the material in the presence of carefully regulated amounts of air, the roast charge being heated in successive stages at gradually increasing but controlled conditions of temperature, said roasting operation being so conducted that substantially all of the magnesium and calcium compounds are selectively converted to the sulfates of those metals while at the same time inhibiting the formation of appreciable amounts of zinc sulfate, and separating the magnesium and calcium sulfates from the zinc-bearing material.

In testimony whereof I affix my signature.

WILLIAM C. HOOEY.